(12) United States Patent
Toulemont et al.

(10) Patent No.: US 8,554,874 B2
(45) Date of Patent: Oct. 8, 2013

(54) METHOD FOR BROADCAST OF AN HTML APPLICATION

(75) Inventors: Ronan Toulemont, Chatillon (FR); Isabelle Le Maguet, Paris (FR)

(73) Assignee: Technicolor, Boulogne-Billancourt (FR)

( * ) Notice: Subject to any disclaimer, the term of this patent is extended or adjusted under 35 U.S.C. 154(b) by 1318 days.

(21) Appl. No.: 10/517,577

(22) PCT Filed: Jun. 12, 2003

(86) PCT No.: PCT/FR03/01767
§ 371 (c)(1),
(2), (4) Date: Mar. 20, 2006

(87) PCT Pub. No.: WO03/107674
PCT Pub. Date: Dec. 24, 2003

(65) Prior Publication Data
US 2006/0248438 A1 Nov. 2, 2006

(30) Foreign Application Priority Data

Jun. 14, 2002 (FR) .................................. 02 07355

(51) Int. Cl.
*G06F 15/16* (2006.01)
(52) U.S. Cl.
USPC ........................................................ 709/218
(58) Field of Classification Search
USPC .......................... 709/217, 218, 203; 715/206
See application file for complete search history.

(56) References Cited

U.S. PATENT DOCUMENTS

| | | | |
|---|---|---|---|
| 5,903,816 A | 5/1999 | Broadwin | |
| 6,128,713 A * | 10/2000 | Eisler et al. | 711/159 |
| 6,184,878 B1 * | 2/2001 | Alonso et al. | 725/109 |
| 6,230,168 B1 * | 5/2001 | Unger et al. | 715/206 |
| 6,282,542 B1 * | 8/2001 | Carneal et al. | 707/10 |
| 6,442,598 B1 * | 8/2002 | Wright et al. | 709/217 |
| 6,507,872 B1 * | 1/2003 | Geshwind | 709/236 |
| 6,597,377 B1 * | 7/2003 | MacPhail | 715/738 |
| 6,647,381 B1 * | 11/2003 | Li et al. | 1/1 |
| 6,697,859 B1 * | 2/2004 | Takahashi | 709/225 |
| 6,886,178 B1 * | 4/2005 | Mao et al. | 725/52 |
| 7,020,893 B2 * | 3/2006 | Connelly | 725/97 |

(Continued)

FOREIGN PATENT DOCUMENTS

| | | |
|---|---|---|
| EP | 1022908 A1 | 7/2000 |
| JP | 9322133 | 12/1997 |
| WO | WO-99/22316 A1 | 5/1999 |

OTHER PUBLICATIONS

Patent Abstracts of Japan, publication No. 10222541, publication date Aug. 21, 1998.

(Continued)

*Primary Examiner* — Firmin Backer
*Assistant Examiner* — Herman Belcher
(74) *Attorney, Agent, or Firm* — Osha Liang LLP

(57) ABSTRACT

For a satellite-based transmission of an HTML application accessible from an initial site, there is provided at the level of an intermediate platform hardware and software means making it possible on the basis of a semantic and syntactic analysis of the application to group together into transmission modules pages of like depth of the application and included components, if any, in these pages. The modules containing the low depth pages are transmitted with a greater frequency than the pages of greater depth.

In this way a user more quickly receives all the information necessary for the displaying of a page.

8 Claims, 3 Drawing Sheets

(56) References Cited

U.S. PATENT DOCUMENTS

| | | | |
|---|---|---|---|
| 7,346,842 B1* | 3/2008 | Hayton et al. | 715/234 |
| 2002/0015056 A1* | 2/2002 | Weinlaender | 345/705 |
| 2002/0107892 A1* | 8/2002 | Chittu et al. | 707/514 |
| 2002/0116707 A1* | 8/2002 | Morris et al. | 725/37 |
| 2003/0020756 A1* | 1/2003 | Bates et al. | 345/788 |
| 2003/0052905 A1* | 3/2003 | Gordon et al. | 345/700 |
| 2003/0067554 A1* | 4/2003 | Klarfeld et al. | 348/461 |
| 2003/0078964 A1* | 4/2003 | Parrella et al. | 709/203 |
| 2004/0073580 A1* | 4/2004 | Nakayama et al. | 707/201 |

OTHER PUBLICATIONS

G. V. Dias, et al.; "A Smart Internet Caching System"; Department of Computer Science and Engineering, University of Moratuwa, Sri Lanka, Malaysia; published Jun. 24, 1996; (retrived from the Internet: http://www.isoc.org/inet96/proceeding s/a4/a4_3.htm).

Birch, Nick: "Building MHP Carousels", Strategy and Technology Ltd., Oct. 2000, 23 pages.

* cited by examiner

METHOD FOR BROADCAST OF AN HTML APPLICATION

CROSS REFERENCE TO RELATED APPLICATIONS

This application claims foreign priority to French application No. 02/07355, filed on Jun. 14, 2002.

TECHNICAL FIELD

The invention lies within the field of methods for extracting from one or more servers and then of transmitting, in an MPEG stream of applications possibly comprising a tree of files, and for which logical links known as navigation links on the one hand and inclusion links on the other hand exist between files together constituting the application.

TECHNICAL BACKGROUND

The technological background of the invention assumes a knowledge of prior data that can be found in reference documents forming part of the general knowledge of the person skilled in the art, in particular the documents listed below:

| Title of the document | Reference of the document or content |
|---|---|
| DVB Multimedia Home Platform | DVB MHP TAM232 r16 |
| Hypertext Transfer Protocol (HTTP) | RFC 2616 HTTP 1.1 http://www.w3.org/Protocols/rfc2616/rfc2616.html |
| Uniform Resource Identifier (URI) | RFC 2396 http://www.ietf.org/rfc/rfc2396.txt |
| HTML specification | HTML 4.01 Specification http://www.w3.org/MarkUp/ |
| The Extensible HyperText Markup Language | XHTML ™ 1.0: The Extensible HyperText Markup Language A Reformulation of HTML 4 in XML 1.0 http://www.w3.org/TR/xhtml1/ |
| Extensible Markup Language | XML - W3C recommendation http://www.w3.org/TR/1998/rec-xml-19980210 |

The description of the state of the art and of the invention also assumes that abbreviations commonly employed by the person skilled in the art are known. It is so common to employ these abbreviations that the person skilled in the art understands better what is being explained to him when these abbreviations are employed than when complete expressions are employed. A list of these abbreviations corresponding generally to initials in English is given below.

| | |
|---|---|
| DSM-CC | (Data Storage Media Command and Control) |
| DVB | (Digital Video Broadcasting) |
| XLET | Application package objects allowing the execution of JAVA applets that may have access to resources of a decoder [DVB-MHP; DVB-HTML] |
| HTML | (HyperText Markup Language) Language allowing the designation of links between texts |
| HTTP | (HyperText Transfer Protocol) protocol for transferring texts in which links to other texts are defined |
| MMI | Man Machine Interface |
| MIME | (Multipurpose Internet Mail Extensions) Extension making it possible in particular to ascertain the definition of the content of a file |
| MHP | Multimedia Home Platform |
| MPEG | Moving Picture Experts Group |
| OCG | Object Carousel Generator |
| SSL | Socket Secure Layer |
| TLS | Transport Layer Security |
| URI | Uniform Resource Identifier of character allowing the identification of a resource |
| URL | Uniform Resource Locator, locating of a document through its protocol, machine, directory, name of the document |
| WWW | World Wide Web |
| XHTML | The Extensible HyperText Markup Language |

Finally, a few terms used in the present document should be made precise:

| | |
|---|---|
| Subscriber or end user | User of an HTML application executing the application with the aid of a navigator integrated into a digital decoder |
| Application | HTML application: the whole set of pages and tree structure of the site |
| Document or file | Any file accessible on a remote http server through a URL |
| Home document | Complete URL determining the site entry point |
| Included document or included component | Document included in a main page: picture, sound, secondary document, application. An included document will be inserted into the page without any intervention by virtue of instructions of a program for presenting the page containing in particular the URL of the included document and tags for locating the included document in the page involved. |
| Document or file linked or pointed at | Document accessible from a main page by clicking on a hyperlink |
| Main document or file | Document or file accessible by clicking on a hyperlink and which is not included in any other document |
| Dynamism | The dynamism of a document makes it possible to advise the OCG of documents liable to require more frequent updating |
| Page | Main document |
| Priority | The priority of a document determines its frequency of transmission. Thus, a document of high priority will be transmitted more frequently than a document of low priority |
| Proxy | Server acting as gateway to the Internet |
| Site | Set of pages served by the WEB server Complete URL of a home page, associated with site limit definition and depth parameters |

Typically an application is made up of a plurality of HTML pages, known as interactive pages.

To download an application, use is made of TCP/IP protocols such as HTTP (hyper text transfer protocol). The application is forwarded from an HTTP server, to a server for transmitting applications (Broadcast Application Servers—BAS) in the form of a tree of files and is then encapsulated into modules, each containing one or more files, in a carousel object transfer protocol such as "Object Carousel Protocol" and inserted into an MPEG stream transmitted for example by a satellite or by cable.

According to the prior technique, a protocol such as DSM-CC Object Carousel complies with the tree structure of the application. The transmission by means of such a protocol complies with the properties of the file system (directory tree) and allows the encapsulation in MPEG sections.

The tree of the application is a directory tree, these directories containing the various files of the application. Thus, for example, it will be possible to have a root directory to which a 0 level is given to which are attached files of level 0 and directories of level 1. The directories of level 1 contain files of level 1 and directories of level 2 and so on and so forth. In general the directories are organized by type of content, for example a directory of images will contain all the images of the application, the corresponding files have a ".gif" termination, another directory will contain the sound products, etc.

This protocol according to the prior technique is suitable for the transmission of a tree of file management systems, but is of no help whatsoever in optimizing the transmission as soon as dependencies, in the form of navigation links, also called hyperlinks, appear between these files, this being the case for an HTML application. Moreover, included components (applet images, sound, etc., this list not being limiting) pointed at by an inclusion link in an HTML file (or main file), necessary for the formulation of the interactive page are not transmitted in an optimal manner in a mode that takes account only of the file tree. Specifically, the page will actually be made available to the end user only after a time corresponding to one or more transmission cycles, if certain included components necessary for the displaying of a page are located in a directory that is very far away from the root directory. Thus from the user's point of view the page access time may be very long and discourage access. The reconstruction of a main document will only be possible when all the included files, for example images or sounds, have been received.

BRIEF DESCRIPTION OF THE INVENTION

Before describing the invention, elements of vocabulary that will be employed for the description are defined in the following table.

| | |
|---|---|
| Priority | The priority of a document determines its frequency of transmission |
| Depth | The depth of a document is defined by the minimum number of mouse clicks, or equivalent, necessary to access it from the home page. The home page as well as its included components have a 0 depth |
| Copying rules | Rules defining the download limits of a site |
| Grouping rule | Rule defining the priority and/or the dynamism of files |

With respect to the prior art just described, the invention aims to optimize the transmission of an application, in such a way that the application and the pages of which it is made up can be made available to an end user as speedily as possible, and then that switches from a current page to an immediately following page (according to the navigation links, page upstream or downstream of the current page) may be as fast as possible.

The invention starts from the observation that the attachment for example of an included component to a main page may be known through the syntactic and semantic analysis of the data included in the main file associated with this page and of the various files of which it is made up. Thus one knows for example, by consulting the HTML file describing the main page, that the main page contains a certain number of included components and it is possible to find the files corresponding to these components in the various directories together making up the application by virtue of the data contained in the HTML file and describing these files.

According to the invention, if for example, a home page of the application contains included components, the files constituting these included components in the home page are grouped together in one and the same transmission module, or in several contiguous modules, if a single module does not suffice to contain the corresponding files. Thus, according to the invention an application is not transmitted according to a tree of directories but according to a logic tree as a function of the content of the application and of the apportionment of this content among the various pages of the application. According to the invention, a level 0 page will for example be the home page of the application, and the included components contained in this page will also have a level 0. This page and its included components will be inserted into one or more contiguous transmission modules. The following pages of logic level 1 with respect to page 0, are the pages that can be called up through a navigation link from page 0. This or these pages of level 1, as well as their included components, if any, will be prepared in the same way so as to be included in one or more modules, and so on and so forth.

To summarize, the invention relates to a method of transmission, from a transmission center to digital television decoders of an application made up of a set of files containing data together constituting interactive pages, each page having a displayable content consisting of a main file and of included components, if any, inclusion links, allowing the display or the execution of included components, if any, so as to obtain the entire interactive page, navigation links each pointing at a main file of an interactive page of higher or lower depth, a home page having a 0 depth level, a level 1 page being a page that can be called up through a navigation link from this page of depth 0, and more generally a page of depth n being a page that can be called up with a minimum of n navigation links from the home page of depth 0, the method comprising a prior step of reception of the file or files necessary for the construction of a plurality of interactive pages with their included components, if any, these files together forming an application or a part of the application corresponding to pages having depth levels lower than a predetermined level, characterized in that it furthermore comprises the following steps:

a) semantic and syntactic analysis of the content of the main files of the application so as to identify the inclusion links and the navigation links, an included component and the main file with which it is associated being retained as having the same depth level, and ranking of the various files by depth level, b) construction of transmission modules, the files necessary for the construction of a complete interactive page with its included components, if any, being included in one or, if necessary, several modules.

The method can furthermore comprise one or more of the following steps:

c) definition of a transmission profile containing in particular transmission order instructions such that each interactive page and its included components, if any, are transmitted with a priority level chosen from at least two priority levels, d) transmission of the modules with a frequency which is dependent on the predefined order of priority.

a1) allocation of a level of dynamism to at least part of the interactive pages, the modules containing pages that are modified more often than others having a greater level of dynamism than the modules containing pages that are modified less often.

a2) selective modification of access links (URL) for navigation and/or for inclusion in at least one interactive page so as to render the entire application or at least a first part of the application accessible in a transmission mode, and possibly render a second part of the application accessible through a return path.

a3) quantitative analysis of the information contained in each file, and as a function of the results of this analysis, of deletion of the pages of depth 1 or higher than 1, commencing with the deletion of the pages of greatest depth, until the remaining amount of information to be transmitted is equal to or less than a predefined quantitative limit.

a4) modification of the application so as to introduce instructions therein allowing a piece of software for managing a cache memory of a digital decoder receiving the application to identify the navigation links between the current page displayed and pages that can be reached through the navigation links of this current page, and to instruct the loading into the cache memory of said pages and of their included components, if any.

a5) introduction into, the application of instructions allowing, in case of access to the second part of the application through the return path; an automatic return to the transmission mode in case of request for access to a page which forms part of the transmitted pages.

Preferably, the priority level defined in step c) is a decreasing function of the depth of the interactive page.

The priority level may also be an increasing function of the dynamism.

The priority level defined in step c) may also be a function of the level of dynamism and/or of depth of the interactive page contained in the module.

It is noted that according to the invention, what is referred to as the copying of the application is the transferring of files together constituting the application, or a part of the latter, from an initial access site, typically a WEB server, to a processing center for transmission. The initial storage site may be a remote server or be situated in the processing center.

When the application comprises a large number of bytes, and when there is a risk that its copying or its transmission might saturate the capabilities of the transmission platform or the capabilities of a digital decoder to which the application is transmitted, it is advantageous to make provision for a maximum limit to the amount of information that will be copied or transmitted. To do this, in addition to the semantic and syntactic analysis of the files together constituting the application, a quantitative analysis of the information associated with each file is carried out, and as a function of the results of this analysis it is possible to decide to halt the copying as soon as the amount of information copied exceeds the predetermined quantitative limit.

Preferably, the bigger the priority allocated, the larger the frequency of transmission of a module. According to one embodiment, the priority levels are fixed in such a way that a page of depth p, and its included components, if any, always has a priority level that is not greater than the priority level of a page of depth lower than p.

Preferably, a level of dynamism is allocated to the application transmission modules, the modules containing pages that are modified more often than others having a larger level of dynamism than the modules containing pages that are modified less often.

BRIEF DESCRIPTION OF THE DRAWINGS

An exemplary embodiment of the method according to the invention will now be described with regard to the appended drawings in which.

DESCRIPTION OF EXEMPLARY EMBODIMENTS

Figure 1:
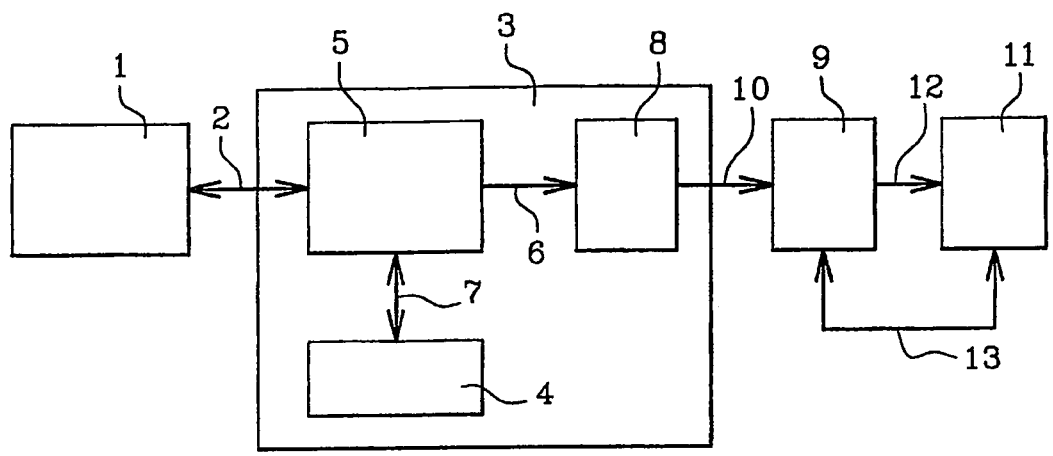
FIG. 1 diagrammatically represents the software and hardware environment of an application transmission and copying tool according to the invention, FIG. 2 diagrammatically represents various modules of functions of the application transmission and copying tool according to the invention and their relationships with other modules and with parameterization data input interfaces.

FIG. 1 diagrammatically represents the software and hardware environment of an application transmission and copying tool according to the invention.

The invention relates to an application transmission and copying method based on an HTTP server 1. This server may be placed in communication through a bidirectional link 2 with a computation unit constituting an intermediate platform 3. The computation unit 3 contains memory means 5 that are in themselves known and which are hooked up to a man machine interface 4 (MMI), for example a keyboard and means for displaying or transforming a sound or image into an electrical quantity, allowing in particular the manual introduction of data commands or of parameters necessary for the control or for the parameterization of the application data which will be processed by the method of the invention. The method according to the invention is implemented in the form of a piece of software stored in the memory means 5 of the computation unit 3.

Links 6, 7 allow the forwarding of the instructions and of the data with a carousel object generation module 8 and the interface 4 respectively. The instructions and the data formulated by the carousel object generation module 8 are forwarded to a multiplexer 9 by way of the link 10. From the multiplexer 9 the instructions and the data are forwarded, for example in the form of an MPEG stream to terminals 11, for example digital decoders associated in a known manner with digital television receivers or with recording apparatus. This forwarding between the multiplexer 9 and a terminal 11 may be performed either through a wide transmission path 12, for example a satellite link or a cable link or else through a restricted link 13 in the form of a return path between the terminal 11 and the multiplexer 9. This return path may for example be a line of the switched telephone network.

Figure 2:
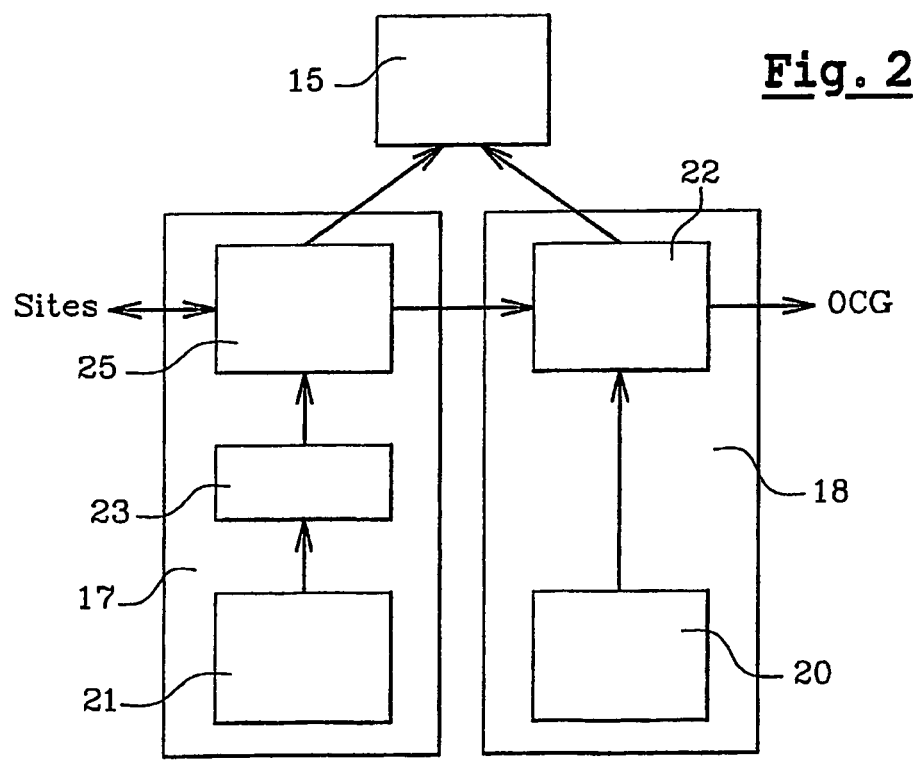

FIG. 2 diagrammatically represents the software blocks together constituting the application transmission and copying tool and its links inside the computation unit 3 to a navigation block 15. The application transmission and copying tool is made up essentially of two blocks, a copying block 17 and a transmission block 18. The copying block 17 comprises a unit 21 for storing the copying parameters, which is accessible through the interface 4 or through a program unit 23. The program unit 23 delivers instructions to a copying unit 25 which copies and organizes the storage of the data originating from the HTTP server 1. The transmission block 18 comprises a unit 20 for storing the transmission parameters, that can be accessed through the interface 4 or through the program unit 23. The data stored in the units 21, 25 may be displayed on a screen or heard on a loudspeaker by way of the navigation software block 15. An operator can thus monitor the data copied and transmitted.

An example of copying and transmitting an application will now be discussed in conjunction with FIGS. 3A and 3B.

For explanatory purposes, the files with "htm" or "html" extensions are dubbed main files. They constitute the body of respective interactive pages. The files whose identity comprises a "gif" or other extension are said to be "included components". Nevertheless, any document accessible by clicking on a navigation link and not pointed at by an inclusion link is a main file (or document). This may be the case for an image.

Figure 3A:
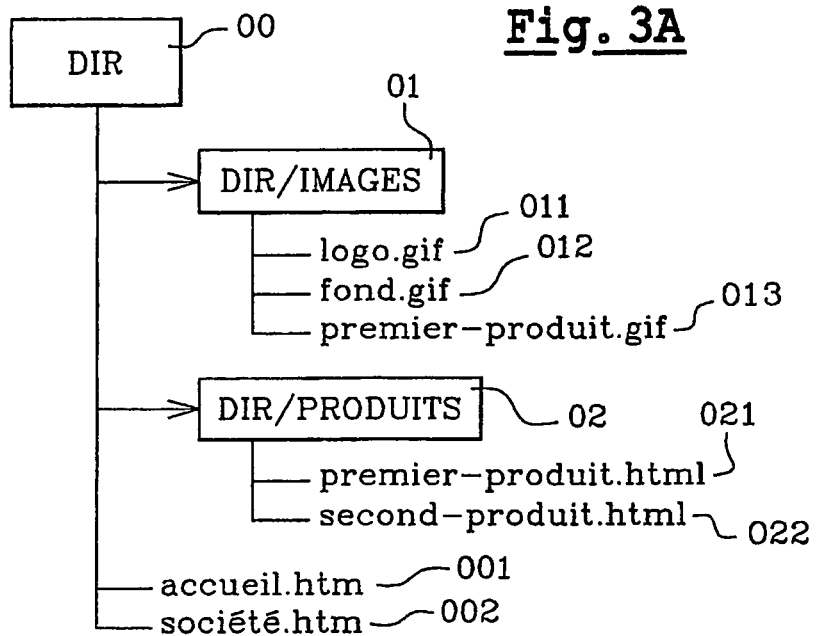
FIGS. 3A and 3B respectively represent the initial and final orders of grouping of an application before copying and after copying.
Figure 3B:
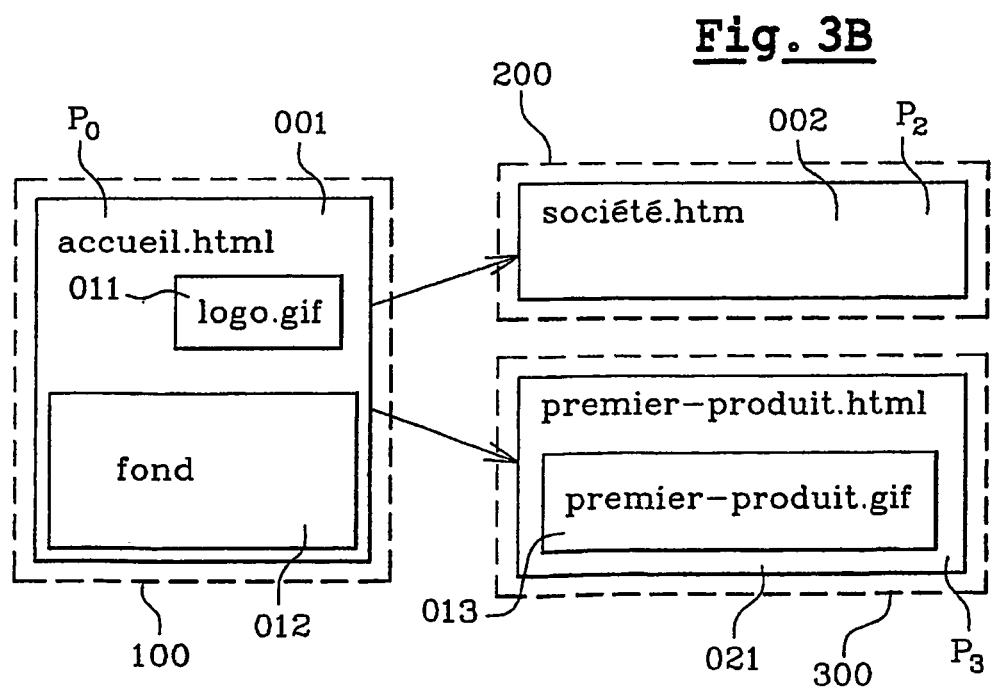

FIG. 3A represents the directory of an application present on a site. In this didactically simple example, the directory comprises, starting from a root "dir" 00, two directories 01 and 02 and two files, for example 001 for a home page and 002 containing data presenting a company. The first directory 01 contains image files having a "gif" extension and which are included components, and the other directory 02 contains files having an "htm(l)" extension and which are main files for presenting products. The directory 01 of images contains for example an image 011 for a logo, an image 012 for a background and an image 013 relating to a first product. For products 02 the directory comprises two files, one 021 containing information about the first product and the other 022 about a second product.

The syntactic and semantic analysis of the files constituting the application makes it possible on the basis of the inclusion links to recognize and to determine the whole set of files necessary for the construction of a displayable page. This analysis also makes it possible on the basis of the navigation links to recognize and to determine the depth level of a page, that is to say the minimum number of navigation link(s) separating a home page of depth level 0 from the page considered.

It is thus possible to group the various files together so as to insert them into modules each containing a page and its included components. FIG. 3B represents the modules formed on the basis of the analysis. In the present case the analysis has made it possible to recognize that the main file 001 is associated with an interactive home page P0, for example, since it bears the name "default.htm" or "index.htm" and that this page P0 contains inclusion links pointing to included components, the logo 011 and the background 012. It also makes it possible to recognize that this page contains three navigation links, the first to the main file 002 for presenting the company, the second to the first product main file 021 and the third to the second product main file 022. It is thus known that there are two pages of level 1, a page P2 and a page P3. Under these conditions the files 001, 011 and 012 are grouped together so as to be included into a module 100 of depth 0 to which is allocated a for example high priority. This signifies that this module 100 will be transmitted with a greater frequency than a module having a lower priority. This module groups together the home page made up of the file 001 and the included components in this home page P0 that are made up in this case of the files 011 and 012. The analysis of the page P3 associated with the first product main file 021 makes it possible to recognize that this page contains an inclusion link to the first product image 013. The file 021 and the included component 013 which is an image are inserted into a module 300 of depth 1. The file 002 which constitutes a linked page P2 connected by a navigation link to the home page P0 is included in a transmission module 200 of depth 1. Arrows between page P0 and pages P3 and P2 respectively, symbolize the navigation links. In this example we stop at depth level 1 for the sake of simplicity. If one or more navigation links of a page of depth 1 were to point to pages of depth 2, these pages would be included in additional modules of depth 2, and so on and so forth in an iterative manner.

Figure 4:
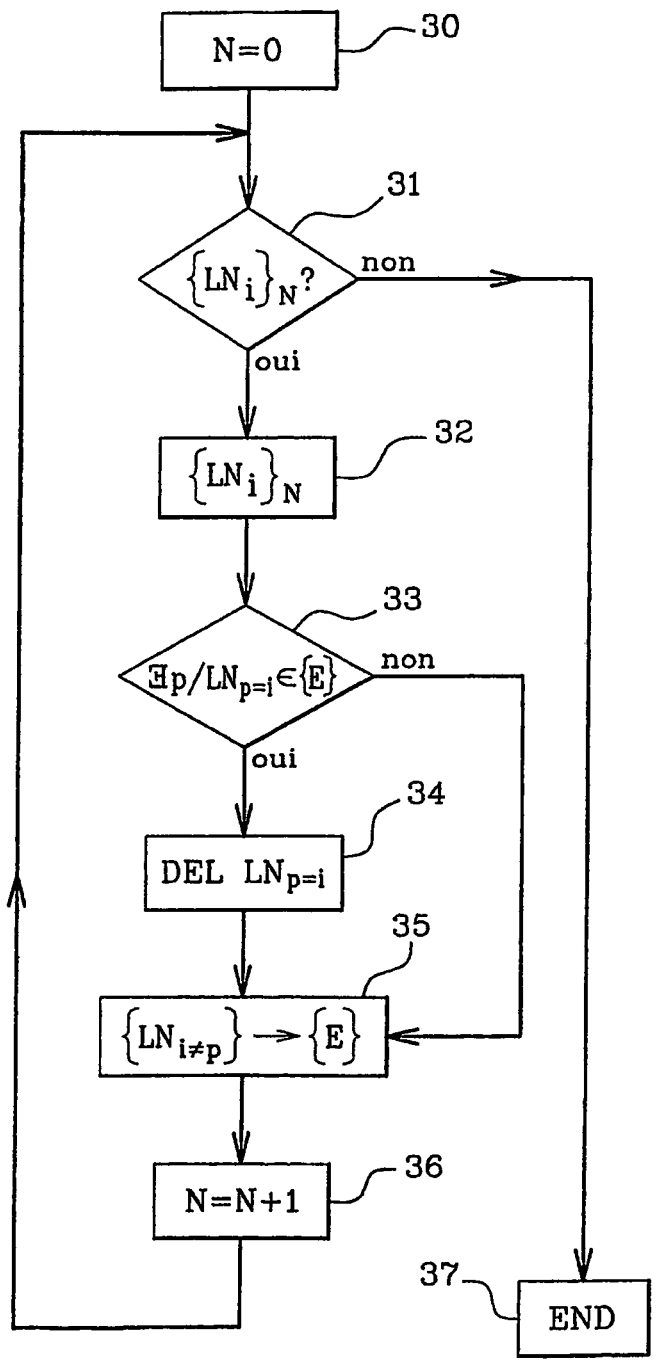
FIG. 4 represents an example of a flowchart of an algorithm allowing the syntactic and semantic analysis of the navigation links so as to perform the grouping of the files together constituting the application or a part of the application by depth level.

An exemplary embodiment of a syntactic and semantic analysis of the navigation and inclusion links will now be discussed in conjunction with FIG. 4. As shown in FIG. 4, the syntactic and semantic analysis of the navigation links for labeling the various pages and determining the depth level of each page is effected in an iterative manner in the following manner. In a first iteration, the home page P0 of depth 0 by convention is detected for example by detecting a file dubbed "default.htm" or "index htm". During subsequent iterations the i1 pages of depth 1 will be analyzed in succession, then the i2 pages of depth 2, until we arrive at the last page of the ij pages of depth j, j being the maximum depth level.

For the home page of depth level 0, the variable N is set to 0. The home page is then analyzed semantically according to step 31. The navigation links, denoted $\{Lni\}_N$, appearing in this home page are detected according to step 31 and then stored according to step 32. The value i is incremented by 1 with each new writing of a navigation link. It should be noted that this variable i is not to be confused with the variable used above to refer to the number of pages per depth level. The navigation links are typically labeled by the presence of semantics of the type (<a href=http://www.abc.com/>bla bla bla</a>). Thereafter it is verified according to a step 33 that these navigation links or more precisely the files that they point at, have not already been pointed at during a previous iteration of the algorithm. To do this, one establishes a set {E} of the files pointed at up to the current iteration. If such files which have already been pointed at in a previous iteration of the algorithm exist, then they are not taken into account. This makes it possible to avoid according several different depth levels to one and the same file. The erasure of said files already written is performed in a step 34. A depth level (N+1) is allocated to the remaining files and the information which identifies these files is stored in the set {E} in step 35. Steps 30-35 are then repeated after having incremented the variable N by the value 1 according to step 36. This implies that these steps are redone for the whole set of navigation links included in the page or pages of level N+1. The iteration is redone until one no longer detects any navigation link in the files pointed at by navigation links included in immediately lower level pages in which case the algorithm terminates its procedure at a step 37.

The copying tool performs the following tasks:

It addresses an HTTP request to the remote server. The content of the request is defined in a detailed manner in HTPP1-1 RFC 2616. The request contains in particular the following information:
   the URL requested,
   the "user-agent" HTTP header, which allows the server to identify the nature of the client navigator,
   the "if modified since" field which allows a conditional update limited to the modifications involved in the document copied between the current date of copying and the previous date of copying of the same document if the document has already been copied,
   the authentication information, if any, regarding the server and regarding a proxy, if any (server acting as gateway to the internet) (basic authentication by b64 encoding).

In order to make the exchanges between the web server and the copying site secure, the secure HTTP employed should be specified, for example SSL or TLS.

Only the GET method is used by the HTTP client included in the webcopier. The scripts associated with the forms, which require input on the client navigator, are not copied.

The HTTP response of the server to the client contains in particular:
   the HTTP return code,
   the information relating to the document:
   its MIME type (text/html, image/gif, etc.),
   its length,
   its date of creation,
   its date of expiry,
   the content of the document.

The return code signals the result of the request ("OK" or "document not modified", or "redirection" if the document has a new URL, or else "error". The information regarding dates is used by the copying tool to manage the updating of the document, whereas the MIME type will be used subsequently in the transmission chain by the DSMCC protocol managed by the OCG.

The copying tool:
  receives and stores locally the pages of one or more sites as well as the information pertaining thereto (content, dates, length, etc.),
  analyzes the HTTP header so as to determine the above information, the errors or the redirections if any,
  goes through the HTML code so as to:
    compute the dependencies and thus make the HTTP requests for the remainder of the necessary documents,
    determine the XLETs used by the HTML application.

On the basis of the above steps, the tool thus reproduces the physical image of the tree of a remote HTTP server as well as a database that groups together the attributes of the documents.

The copying tool is configurable by the operator with the aid of the interface 4 so as to:
  possibly limit the content copied from the remote site or sites as a function of a depth, or of a size of data, or of a list of regular expressions of URLs or else by rejecting certain types of contents, or finally by combining these various modes of limitation,
  triggering, automatically, the copying of a given remote site according to a predetermined periodicity or dates.

The following table describes the profile of a site and the data output by the copying tool. The input parameters can be configured globally or customized for each site.

| Copying tool | |
| --- | --- |
| Input parameters | The connection parameters:<br>  the server hosting the site to be copied<br>  the authentication parameters, if any (login and password)<br>  the address of the connection proxy, if any and the authentication parameters, if any<br>  the connection timeout<br>  the number of connection attempts following failure<br>The copying parameters:<br>  the URL of the home page of the site copied<br>  the desired copying depth<br>  the maximum number of files to be copied<br>  the total size limit of the site<br>  the size limit for each document making up the site<br>  the download limits: regular expressions of the URLs and MIME types of the documents authorized<br>  the identification of the client navigator or user agent<br>  the action to be performed in the case of invalid or unauthorized links<br>  the date of the previous copy supplementing the "if modified since" condition allowing conditional copying during an update<br>The rights of access to the XLETs, which will be monitored when going through the HTML code |
| Output data | The site (the HTML application):<br>  the tree of the site copied and its content<br>  the HTML documents rewritten: the uncopied links will be replaced by a URL http://, by a default page or deleted.<br>A description of the content:<br>  the information relating to each document (type, size, etc.)<br>  the dependencies between the documents making up the copied site<br>The XLETs used<br>A journal file comprising the details of the operations performed and the errors, if any. |

These input and output parameters or at least some of them may be entered from the MMI which comprises the necessary dialog boxes.

During copying, a state window informs the operator of the progress of the copying. Once the copying has been performed, the operator is able to view the content copied by virtue of the integrated navigator 15. He can thus monitor the proper downloading of the content.

In case of update, only the documents modified since the previous copy will be retrieved.

The optimization grouping phase will now be described.

The grouping tool performs the following tasks. It essentially entails a process for grouping the data so as to allow optimization of transmission to a navigator implemented at the level of the terminal 11.

The grouping tool performs the following computations on the basis of the data obtained by the copying tool and of the rules for setting to transmit entered by the operator:

(a) grouping of each interactive page and of the components included in this interactive page. This grouping forms the subject of a transmission module. If one and the same document happens to be included in several pages (for example in the case of a logo image), this document will be attached to the first module of lowest depth and of highest priority. This grouping is obtained through the semantic and/or syntactic analysis of the files. In the case of an inclusion these links consist of inclusion links, pointing to an included component to be loaded with the interactive page, this included component possibly being in particular:
  an image,
  a multimedia file, for example an image or sound or video
  an executable application in the interactive page,
  any other text or binary document.

(b)—allocation of the transmission parameters to the main documents and in particular cases to the included documents. These parameters are:
  the priority which designates the frequency of transmission (for example: high, normal, low), that is to say the importance of the document,
  the dynamism which makes it possible to advise the OCG of the documents liable to require more frequent updating. It is intended to minimize the cost of the process for updating the application transmitted. The fact that the documents which require more frequent updating are advised by a dynamism value allows a grouping of these documents at the OCG level. The dynamism attribute makes it possible to advise the OCG of the documents liable to change more frequently than the remainder of the application. This will allow the OCG to organize the application in the carousel so as to minimize the time taken to sectionalize the application. It may be considered that on a website, in general more than 80% of the site remains unchanged during an update. If the documents having large dynamism are grouped together then the update affects only 20% of the modules at the OCG level. It can have two values: "dynamic" or "static", the latter being the default value.

The parameter association and allocation actions are performed as a function of rules defined by the operator. These rules make it possible to:
  Associate an included document with a main document.
  Allocate a priority as a function of the following criteria: depth and/or size and/or type and/or date of modification and/or regular expression applied to the URL.

In order to automate the computation of the transmission attributes, the operator defines, from the MMI, grouping rules. He can, as a function of criteria defined hereinbelow, associate a priority and/or a dynamism with one or more documents, and associate or disassociate an included document with a main document (this will generally entail an image included in several main documents or more specific cases, screen background of large size to be divorced from its attachment page which should keep a high priority).

| Criterion | Example |
|---|---|
| Depth | Depth 0 and 1: high priority, depth 2: normal, depth 3 and more: low |
| URL | /image/background.gif: low priority /adverts/index.html: low priority |
| Regular expression | *adverts*: low priority |
| Date | Date of modification >10 days: normal priority |
| MIME type | Image type/* low priority |
| List of criteria (and/or) | Size >300 Kbytes and image/*: low priority |

The rules are preferably applicable to the main documents and applied in a transparent manner to the dependencies.

In addition to the data relating to the application, instructions intended for the decoder which receives the application will be transmitted. Thus instructions will for example be transmitted aimed at allowing loading of a cache memory of the decoder as a function of the page currently displayed. These instructions will allow a piece of software for managing a cache memory of a digital decoder to identify the navigation links between the current page displayed and pages that can be reached through navigation links of this current page. The instructions will allow the digital decoder to search by priority through the MPEG transmission stream of the application for the modules containing the pages of immediately higher or lower depth if the depth of the page displayed currently is different from 0. After identification the loading into the cache memory of said pages of immediately higher or lower depth and of their included components, if any, will be instructed. The transmission of the instructions to allow the anticipated loading of the cache memory is necessary only if the digital decoders do not comprise any software that already fulfils this function.

In this way at the user level the navigation, in particular the duration of display of a page called up from the current page will be shortened since the pages that can be called up from the current page will already be being loaded or will have been loaded into the cache memory.

Other instructions will allow the decoder to determine that nontransmitted pages are accessible through the return path. The code of the application is rewritten according to the mode of access to the various documents constituting the application. The links identified are modified so as to be used by the digital television decoder. A modified navigation link will comprise in particular an indication allowing the decoder to ascertain the mode of transmission of the document pointed at by the link, and therefore to load it either by using the return path, or by taking it in the transmission stream. In particular the addressing protocol semantics will be modified from "http://" to "dvb://" in the case of the presence of a page or other document in the transmission stream, or will remain "http://" in the case where the loading has to be done through the return path.

The apportioning, if any, of the application among various physical access paths allows best use of the available bandwidth in the wide transmission mode. The documents to which access is requested most often are transmitted in the stream. The documents that are consulted more rarely or that require interaction with the server hosting the original application, i.e., before copying, are accessed through the return path. During navigation using the return path, instructions make it possible to automatically reconnect the decoder to the wide transmission path if a document requested in the course of this navigation on this return path is also accessible through the wide transmission path.

The invention claimed is:

1. A method of transmission, from a transmission center to digital television decoders, of an application made up of a set of files containing data together constituting interactive pages, a home page of the application having a 0 depth level, a level 1 page being an interactive page that can be called up through a navigation link from the home page, and more generally a page of depth n being a page that can be called up with a minimum of n navigation links from the home page of depth 0, the method comprising:

receiving the set of files necessary for a construction of a plurality of interactive pages, each interactive page comprising a main file and included components, wherein the set of files form an application or a part of the application corresponding to pages having depth levels lower than a predetermined level;

analyzing semantic and syntactic content of a first main file of the application to identify inclusion links and the navigation links, wherein the inclusion links point to included components necessary to form a first interactive page and facilitate display and execution of the included components, wherein the navigation links reference at least a second main file of a second interactive page that is of higher or lower depth than the first interactive page, and wherein analyzing the semantic and syntactic content of the first main file comprises, for each navigation link in the first main file:

detecting the navigation link, and processing a file referenced by the navigation link when information identifying the file not in a set of previously referenced files by:
storing the navigation link with a value identifying an order of detection and a value of the depth level of the first main file, incrementing the value identifying the order of detection for each subsequent navigation link in the first main file, and storing the information identifying the file in the set of previously referenced files;

assigning, based on the value of the depth level of the first main file, a depth level to the first interactive page and the second interactive page of the application, wherein the included components and the main file associated with each interactive page comprises the same depth level;

ranking each of the first and second interactive pages by depth level, wherein the home page of the application has a depth level of 0 and an interactive page comprising a depth level of n is a page referenced using a minimum of n navigation links from the home page;

constructing transmission modules, wherein the files necessary for the construction of a complete interactive page and corresponding included components are included in one or more transmission modules, wherein the transmission modules are constructed and transmitted in order of depth level;

defining a transmission profile comprising transmission order instructions providing that each interactive page and corresponding included components are assigned and transmitted with a priority level; and transmitting the modules with a frequency that is dependent on the order of priorities defined in the transmission profile,
wherein if a same file is included in a plurality of interactive pages, the same file is attached to a first transmission module of a lowest depth level and a highest priority level.

2. The method according to claim 1, further comprising allocating a level of dynamism to the transmission modules, wherein the transmission modules comprising interactive pages that are modified more often than others are allocated a greater level of dynamism than the transmission modules comprising interactive pages that are modified less often.

3. The method according to claim 1, wherein the priority level is a decreasing function of the depth of the interactive page.

4. The method according to claim 2, wherein the priority level is an increasing function of the dynamism.

5. The method according to claim 1, further comprising:
selectively modifying URL access links for navigation or for inclusion in at least one interactive page to render the entire application or at least a first part of the application accessible in a transmission mode, and to render a second part of the application accessible through a return path.

6. The method according to claim 1, furthermore comprising a step:
quantitatively analyzing the information contained in each file, and as a function of the results of this analysis, deleting the interactive pages assigned a depth greater than or equal to 1, commencing with the deletion of the pages of greatest depth, until the remaining amount of data to be transmitted is equal to or less than a predefined quantitative limit.

7. The method according to claim 1, further comprising:
modifying the application to include software instructions for managing a cache memory of a digital decoder configured to receive the application, wherein the software instructions are configured to:
identify the navigation links between a current interactive page displayed and interactive pages referenced by the navigation links of the current interactive page, and
load, into the cache memory, said interactive pages referenced by the current interactive page and corresponding included components.

8. The method according to claim 5, further comprising:
modifying the application to include software instructions configured to provide when accessing the second part of the application through the return path, an automatic return to the transmission mode when a request for access to an interactive page which forms part of the transmitted pages is received.

* * * * *